United States Patent
Mestres Rosas et al.

(10) Patent No.: US 12,472,708 B2
(45) Date of Patent: Nov. 18, 2025

(54) TREATMENT OF PARTS BY VAPORIZED SOLVENT

(71) Applicant: Peridot Print LLC, Palo Alto, CA (US)

(72) Inventors: Arnau Mestres Rosas, Sant Cugat del Valles (ES); Ariadna Marin Camara, Sant Cugat del Valles (ES); Natalie Harvey, Sant Cugat del Valles (ES); Xavier Gasso Puchal, Sant Cugat del Valles (ES)

(73) Assignee: PERIDOT PRINT LLC, Palo Alto, CA (US)

( * ) Notice: Subject to any disclaimer, the term of this patent is extended or adjusted under 35 U.S.C. 154(b) by 79 days.

(21) Appl. No.: 18/287,859

(22) PCT Filed: Apr. 29, 2021

(86) PCT No.: PCT/US2021/029950
§ 371 (c)(1),
(2) Date: Oct. 20, 2023

(87) PCT Pub. No.: WO2022/231599
PCT Pub. Date: Nov. 3, 2022

(65) Prior Publication Data
US 2024/0181728 A1    Jun. 6, 2024

(51) Int. Cl.
| | |
|---|---|
| C08J 7/02 | (2006.01) |
| B29C 64/188 | (2017.01) |
| B29C 71/00 | (2006.01) |
| B33Y 40/20 | (2020.01) |
| F26B 5/04 | (2006.01) |
| F26B 9/06 | (2006.01) |
| F26B 21/06 | (2006.01) |
| F26B 21/10 | (2006.01) |

(Continued)

(52) U.S. Cl.
CPC ........ *B29C 71/0009* (2013.01); *B29C 64/188* (2017.08); *B33Y 40/20* (2020.01); *F26B 21/145* (2013.01); *B29C 2037/90* (2013.01); *B29C 2791/006* (2013.01)

(58) Field of Classification Search
CPC .............. B29C 2037/90; B29C 64/188; B29C 71/0009; B29C 2791/006; B33Y 40/20; C08J 7/02; F26B 5/04; F26B 9/06; F26B 21/06; F26B 21/10; F26B 21/12; F26B 21/145
USPC ....... 264/40.1, 232, 340, 341; 425/135, 140, 425/143, 445; 34/92, 402, 403, 486, 524, 34/526, 562
See application file for complete search history.

(56) References Cited

U.S. PATENT DOCUMENTS 8,123,999 B2    2/2012    Priedeman, Jr. et al.

FOREIGN PATENT DOCUMENTS

| WO | 2018/127683 A1 | 7/2018 |
| WO | 2019/201922 A1 | 10/2019 |

(Continued)

*Primary Examiner* — Leo B Tentoni
(74) *Attorney, Agent, or Firm* — Michael Dryja

(57) ABSTRACT

A method is described in which a part is placed within a chamber. Vaporized solvent is provided within the chamber such that the solvent condenses onto and treats the part. A vacuum is then applied to the chamber to extract the solvent and stop the treatment. The vacuum is controlled such that a pressure within the chamber over time has a predefined profile to prevent defects in the part from occurring due to the extraction of solvent from the part.

18 Claims, 2 Drawing Sheets

(51) Int. Cl.
*F26B 21/12* (2006.01)
*F26B 21/14* (2006.01)
*B29C 37/00* (2006.01)

(56) References Cited

FOREIGN PATENT DOCUMENTS

| WO | 2020/049186 A1 | 3/2020 |
|----|----------------|--------|
| WO | 2020/222743 A1 | 11/2020 |
| WO | 2021/021119 A1 | 2/2021 |

TREATMENT OF PARTS BY VAPORIZED SOLVENT

BACKGROUND 3D printed parts may be treated with a solvent after printing to modify some aspect of the part. For example, a solvent treatment may be used to modify the aesthetic appearance of 3D printed parts. In some examples, a printed part is exposed to a vaporized solvent, which condenses on and softens the surfaces of the part to provide a higher surface smoothness.

DETAILED DESCRIPTION

In some examples of 3D printed part treatment, parts are exposed to a vaporized solvent, which condenses on and softens the surfaces of the parts to provide a higher surface smoothness. The solvent, which may be hazardous, is subsequently extracted from the parts by vacuum. However, the extraction process can result in defects, such as blisters, forming on the parts.

Figure 1:
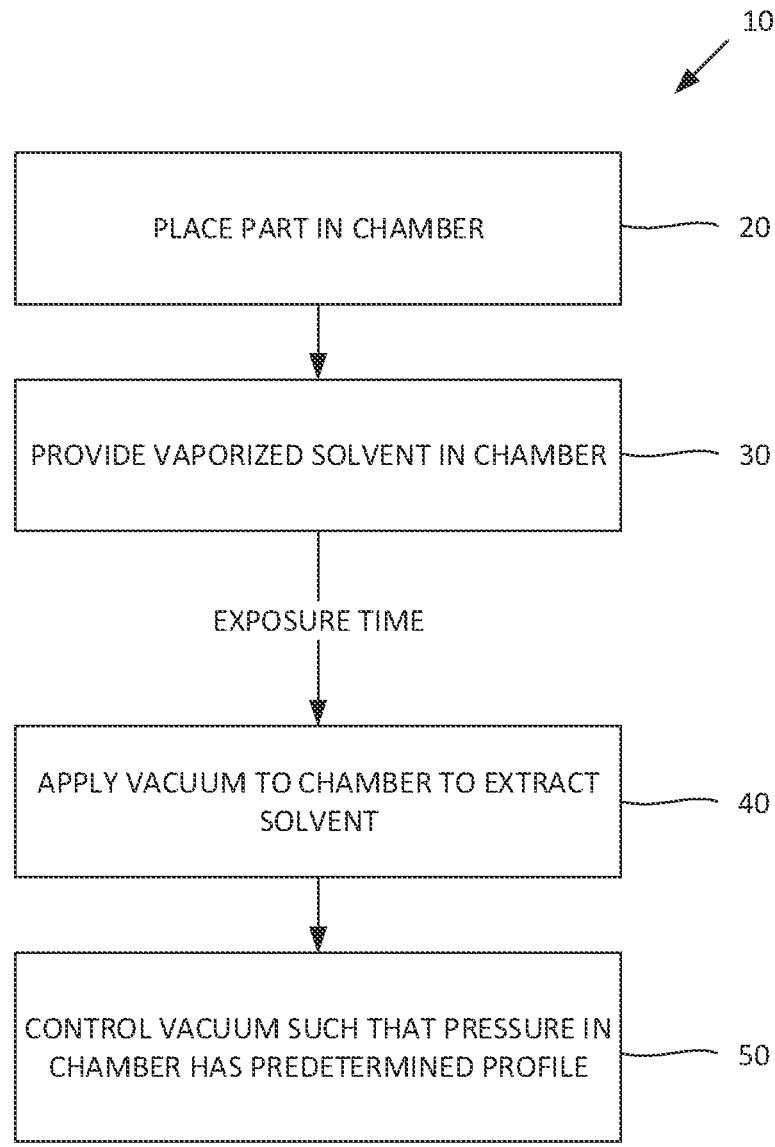
FIG. 1 shows an example method of treating a part.

FIG. 1 shows an example method of treating a part.

The method 10 comprises providing 20 a part within a chamber. The part may be a 3D printed part or other part formed by additive manufacturing. The part may be formed of a plastic material, such as polyamide, polypropylene, ABS, PEEK, polyurethane (e.g. TPU) or polyphthalamide (e.g. TPA).

The method 10 further comprises treating 30 the part by providing vaporized solvent within the chamber, and exposing the part to the vaporized solvent for a period of time, referred to hereafter as the exposure time or period.

Providing the vaporized solvent may comprise generating the vaporized solvent (e.g. by heating liquid solvent) outside of the chamber and then introducing the vaporized solvent into the chamber. Alternatively, liquid solvent may be introduced into the chamber, and the solvent may be heated and/or the pressure within the chamber may be reduced so as to vaporize the solvent. In one example, the pressure within the chamber may be reduced such that, as the liquid solvent is introduced into the chamber, the solvent immediately vaporizes.

The solvent may be an organic solvent, such as hexafluoroisopropanol (HFIP), m-cresol, formic acid, trifluoroacetic acid, sulphuric acid, acetone, benzyl alcohol, or a mixture of organic solvents. The particular choice of solvent may depend on the material of the part and the desired degree or nature of the desired treatment.

During the exposure period, vaporized solvent condenses onto and softens the surfaces of the part, which then reflow. As a result, changes in the surface smoothness, the dimensional accuracy and/or mechanical properties of the part may be observed.

At the end of the exposure period, the method 10 comprises applying 40 a vacuum to the chamber to extract the solvent and stop the treatment. If the exposure period is exceeded, the parts may be damaged or the treatment may not have the desired effect. In applying the vacuum, the pressure within the chamber decreases. This in turn causes solvent within the part to outgas and evaporate.

The applicant has observed that the rate at which the pressure decreases within the chamber may affect part quality. In particular, if the rate of change of pressure is too great, defects may form in the part. Mechanistically, this is thought to occur because the solvent outgasses at such a rapid rate that the solvent bubbles and bursts through the softened surface of the part. The method 10 therefore comprises controlling 50 the vacuum such that the pressure within the chamber over time has a predefined profile. The predefined profile is then defined so as to prevent defects from occurring due to the evaporation of the solvent, but is also defined to prevent the part from being over exposed to the solvent.

The predefined profile may be defined by at least one of the following: (i) the material of the part, (ii) the geometry of the part, (iii) the composition of the solvent, (iv) the quantity or dosage of the solvent provided in the chamber, (v) the temperature within the chamber, and (vi) the exposure time. Each of these factors may play a role in the occurrence of part defects during treatment. For example, different part materials and/or different solvents may have different propensities to part defects. The composition of the solvent, the quantity of the solvent, the temperature within the chamber and the exposure time, are each likely to influence the amount of solvent that condenses onto the part and the depth to which solvent penetrates the surfaces of the part. For example, a higher quantity of solvent and a longer exposure time are each likely to increase the amount of solvent that condenses onto the part.

The extraction of solvent may continue for a predefined period or until the pressure within the chamber reaches a predefined value. At the end of the extraction period (i.e. the period over which the vacuum is applied), the vacuum is stopped, the chamber is vented to ambient pressure and the part is removed from the chamber.

The method described above may be regarded as comprising a solvent exposure phase, and a solvent extraction phase. In the solvent exposure phase, the part is exposed to vaporized solvent for an exposure period. In the solvent extraction phase, a vacuum is applied to the chamber to extract solvent from the part over an extraction period. During the extraction period, the vacuum is controlled such that the pressure within the chamber has a predefined profile to prevent defects from occurring in the part.

If the total time over which the part is exposed to solvent is overly long, either as a result of a prolonged exposure phase or a slow extraction phase, the solvent may penetrate deeper into the part or may excessively treat a part. For example, over exposure may cause detailed features of the part to be smoothed away. Over exposure may additionally or alternatively result in a higher level of residual solvent in the part at the end of the extraction phase, which may subsequently leach to the surface after the part has been removed from the chamber. There is therefore a desire to extract the solvent quickly to avoid over exposure. There is also the desire, however, to extract the solvent slowly to prevent part defects from occurring. The predefined profile is therefore defined so as to balance these two competing factors.

The applicant has observed that defects in the part are more likely to occur when the pressure within the chamber is below a certain threshold. A stronger vacuum (i.e. a higher rate of change of pressure) may therefore be applied at pressures above this threshold in order to reduce the length of the extraction period. A weaker vacuum (i.e. a lower rate of change of pressure) may then be applied at pressures below this threshold in order to prevent the occurrence of defects. The predefined pressure profile may therefore comprise a first region over which the pressure decreases at a first rate, and a second region over which the pressure decreases at a second lower rate. The first rate may be significantly higher than the second rate. In one example, the first rate be at least five times that of the second rate. As a result, a significant reduction in the extraction period may be achieved.

The first region may have a predefined period or a predefined minimum pressure. That is to say that, over the first region of the predefined profile, the vacuum may be applied for predefined period of time or until the pressure within the chamber has a reached a predefined threshold (i.e. the predefined minimum pressure).

The pressure threshold, below which defects in the part are more likely to occur, which may depend on a number of factors, such as: (i) the material of the part, (ii) the geometry of the part, (iii) the composition of the solvent, (iv) the quantity or dosage of the solvent provided in the chamber, (v) the temperature within the chamber, and (vi) the exposure time. Accordingly, the first region may have a predefined period or a predefined minimum pressure that is defined by these factors.

The pressure within the chamber over the second region may be smoothly varying (e.g. linear or logarithmic). Alternatively, the pressure over the second region may be stepped. That is to say that the second region may comprise periods that are relatively short in duration and over which the pressure within the chamber decreases markedly. More particularly, each step may comprise a first period (i.e. the tread) over which the rate of change of pressure is relatively low, followed by a second shorter period (i.e. the riser) over which the rate of change of pressure is relatively high. By employing a stepped profile, relatively good control over the pressure within the chamber may be achieved using a relatively simple vacuum pump. In particular, rather than employing a vacuum pump having a controllable setpoint, the pressure within the chamber may be controlled using a vacuum pump that is repeatedly turned off and on. Moreover, in comparison to a smoothly varying profile, a stepped profile may result in shorter extraction times whilst continuing to prevent part defects. For example, after stepping down the pressure, there follows a period (i.e. the first period) over which the rate of change of pressure is relatively low. This then provides an extended period for the solvent to outgas and for the surface of the part to relax and rearrange before the pressure is again decreased.

Defects in the part may arise if the height of each step is too large, i.e. if the rate of change of pressure over the second period is too high. In one example, the height of each step may be no greater than 20 mbar. The maximum height of each step may depend on a number of factors, such as (i) the material of the part, (ii) the geometry of the part, (iii) the composition of the solvent, (iv) the quantity or dosage of the solvent provided in the chamber, (v) the temperature within the chamber, and (vi) the exposure time.

The temperature within the chamber may influence the overall aesthetics, and in particular the color, of the part. Accordingly, it may be desirable to employ different temperatures according to, for example, the part material or the desired aesthetics. The applicant has observed that the occurrence of part defects can be sensitive to the temperature within the chamber. For example, as the temperature within the chamber increases, the pressure threshold below which defects are more likely to occur may also increase. By employing a predetermined profile that depends at least on the temperature within the chamber, defects may be prevented whilst also achieving a desired aesthetic for the part.

Figure 2:
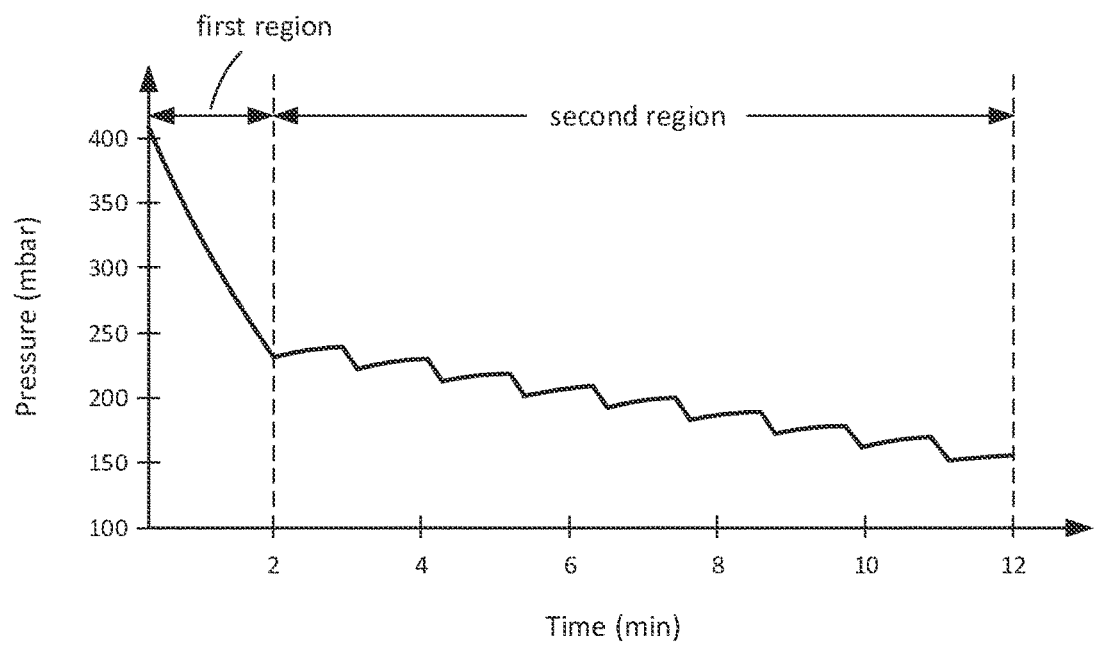
FIG. 2 shows an example profile of the pressure within a chamber during treatment of a part.

FIG. 2 illustrates an example of a predefined pressure profile. In this particular example, the pressure within the chamber is around 400 mbar prior to application of the vacuum, i.e. the pressure prior to the solvent extraction phase is around 400 mbar. The vacuum is initially applied for a period of two minutes, during which time the pressure decreases from around 400 mbar to around 230 mbar. The vacuum is then stopped for a period of 1 minute. During this time, the pressure within the chamber increases slightly (by around 5 mbar) due to outgassing of solvent from the part. The vacuum is then reapplied and the pressure within the chamber again decreases. When the pressure has dropped by 15 mbar, the vacuum is again stopped or suspended for a period of 1 minute, and the pressure within the chamber again increases slightly due to outgassing. This process is then repeated for a predefined number of steps, which in this example is nine steps. The vacuum is then stopped, and the chamber is vented to ambient.

In the particular example of FIG. 2, the predefined pressure profile may be said to have a first region over which the pressure decreases from around 400 mbar to around 230 mbar, followed by a second region over which the pressure decreases in steps from around 230 mbar to around 155 mbar. The first region has a duration of two minutes, and the second region has a duration of about 10 minutes. Accordingly, the rate of change of pressure within the chamber is around 1.42 mbar/second over the first region and around 0.13 mbar/second over the second region. The rate of change of pressure over the first period is therefore around 10 times higher than that over the second period. As a result, a relatively short extraction period may be achieved. By contrast, if the rate of 0.13 mbar/second was used throughout the extraction phase (i.e. from 400 mbar to 155 mbar), the extraction period would increase from 12 minutes to 31 minutes.

In the example of FIG. 2, the vacuum is applied initially for a predefined period of two minutes, i.e. the first region has a predefined period of two minutes. Conceivably, the vacuum may instead be applied until the pressure within the chamber reaches a predefined threshold of, say, 230 mbar, i.e. the first region may instead have a predefined minimum pressure of 230 mbar.

Figure 3:
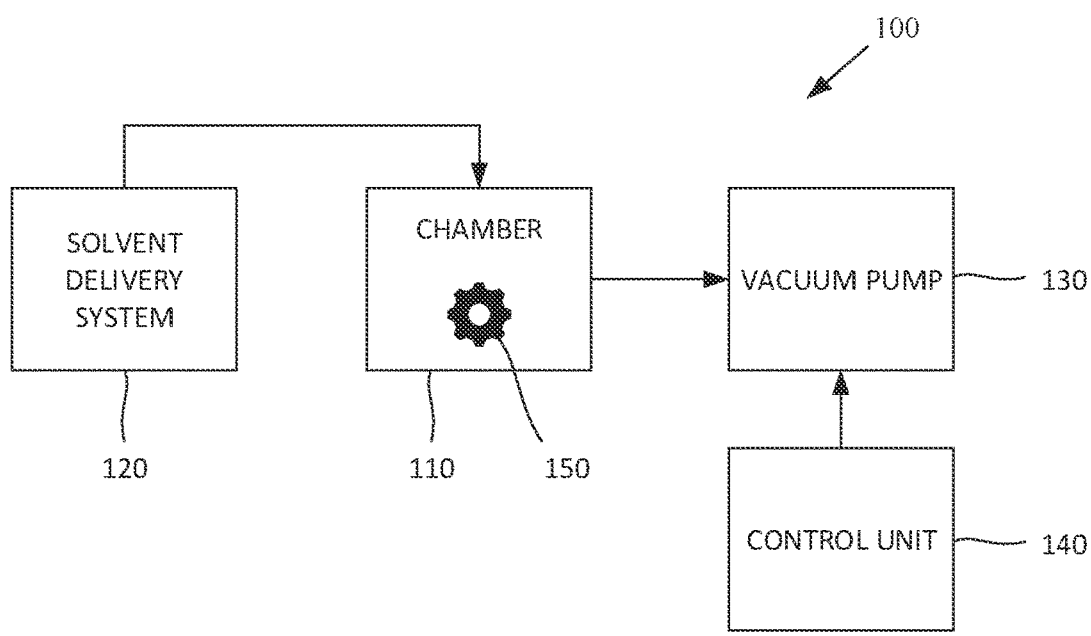
FIG. 3 shows an example processing station.

FIG. 3 illustrates a processing station, which may be used to implement the method of FIG. 1. The processing station 100 comprises a chamber 110 to receive a part 150, a solvent delivery system 120 to deliver solvent within the chamber, a vacuum pump 130 to reduce a pressure within the chamber, and a control unit 140 to control the vacuum pump.

In this particular example, the control unit 140 reduces the pressure within the chamber 110 after the part 150 has been placed into the chamber. The solvent delivery system 120 heats a liquid solvent, which is then introduced into the chamber 110. Owing to the reduced pressure within the chamber, the liquid solvent is immediately vaporized. In another example, the solvent delivery system 120 may generate and introduce a vaporized solvent into the chamber 110. In a further example, the solvent delivery system 120 may introduce liquid solvent into the chamber 110, and heaters may heat the liquid solvent to vaporize the solvent.

After the part 150 has been exposed to the vaporized solvent for a period of time (solvent exposure phase), the control unit 140 controls the vacuum pump 130 so as to extract the solvent from the chamber 110 and the part 150 (solvent extraction phase). The control unit 140 controls the vacuum pump 130 such that the pressure within the chamber 110 over time has a predefined profile. In one example, the control unit 140 may comprise a pressure sensor for sensing the pressure within the chamber 110. In another example, the vacuum pump 130 may comprise an integrated pressure sensor, the output of which is then delivered to the control unit 140.

The predefined profile employed by the control unit 140 prevents defects in the part 150, which might otherwise occur due to the extraction of solvent from the part. The predefined profile may be defined by at least one of the following factors: (i) the material of the part, (ii) the geometry of the part, (iii) the composition of the solvent, (iv) the quantity or dosage of the solvent provided by the solvent delivery system, (v) the temperature within the chamber, and (vi) the exposure time. The control unit 140 may comprise an interface, such as a user interface, to receive data relating to or describing such factors. The control unit 140 may then use the received data to define the predefined profile.

Although not shown, the processing station 100 may comprise a solvent recovery system to recover solvent from the gas extracted from the chamber 110 by the vacuum pump 130. Additionally, the processing station may comprise a heater, which may be controlled by the control unit 140, to control the temperature within the chamber 110.

The preceding description has been presented to illustrate and describe examples of the principles described. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the examples, or any combination of any other of the examples.

What is claimed is:

1. A method comprising:
   placing a part within a chamber;
   providing vaporized solvent within the chamber such that the solvent condenses onto the part and treats the part via chemical-mechanical polishing (CMP);
   applying a vacuum to the chamber to extract the solvent and stop treatment of the part via the CMP; and
   controlling reduction of pressure within the chamber over time to apply the vacuum, according to a predefined time-pressure profile, to at least reduce defects in the part occurring due to the extraction of solvent from the part during application of the vacuum that stops the CMP.

2. The method of claim 1, wherein the predefined time-pressure profile is defined by at least one of: (i) a material of the part, (ii) a geometry of the part, (iii) a composition of the solvent, (iv) a quantity of the vaporized solvent provided in the chamber, (v) a temperature within the chamber, and (vi) an exposure time between providing the vaporized solvent within the chamber and applying the vacuum.

3. The method of claim 1, wherein the predefined time-pressure profile comprises a first region over which the pressure within the chamber decreases at a first rate, and a second region over which the pressure within the chamber decreases at a second lower rate, and the first region has a predefined period or a predefined minimum pressure.

4. The method of claim 1, wherein the predefined time-pressure profile comprises a first region over which the pressure within the chamber decreases at a first rate, and a second region over which the pressure within the chamber decreases at a second rate, and the first rate is at least five times that of the first rate.

5. The method of claim 1, wherein the predefined time-pressure profile comprises a stepped region.

6. The method of claim 5, wherein each step in the stepped region has a height of no greater than 15 mbar.

7. The method of claim 1, wherein the predefined time-pressure profile comprises periods during which the pressure within the chamber increases.

8. A method comprising:
   providing a part within a chamber;
   causing vaporized solvent to condense onto the part such that the part is treated via chemical-mechanical polishing (CMP);
   applying a vacuum to the chamber to extract the solvent and stop treatment of the part via the CMP; and
   controlling reduction of pressure within the chamber over time to apply the vacuum, according to a predefined time-pressure profile, to prevent at least reduce defects in the part caused by extraction of the solvent during application of the vacuum that stops the CMP,
   wherein the predefined time-pressure profile is defined by at least one of: (i) a material of the part, (ii) a geometry of the part, (iii) a composition of the solvent, (iv) a quantity of the vaporized solvent, (v) a temperature within the chamber, and (vi) a solvent exposure time.

9. The method of claim 8, wherein the predefined time-pressure profile comprises a first region over which the pressure within the chamber decreases at a first rate, and a second region over which the pressure within the chamber decreases at a second lower rate, and the first region has a predefined period or a predefined minimum pressure.

10. The method of claim 8, wherein the predefined time-pressure profile comprises a first region over which the pressure within the chamber decreases at a first rate, and a second region over which the pressure within the chamber decreases at a second rate, and the first rate is at least five times that of the first rate.

11. The method of claim 8, wherein the predefined time-pressure profile comprises a stepped region.

12. The method of claim 8, wherein the predefined time-pressure profile comprises periods during which the pressure within the chamber increases.

13. The method of claim 8, wherein the predefined time-pressure profile is to at least reduce defects in the part occurring due to outgassing of solvent from the part.

14. A processing station comprising:
   a chamber to receive a part;
   a solvent delivery system to deliver solvent within the chamber to treat the part via chemical-mechanical polishing (CMP);
   a vacuum pump to apply a vacuum to the chamber to extract the solvent and stop treatment of the part via the CMP; and
   a controller to control the vacuum pump to control reduction of pressure within the chamber over time to apply the vacuum, according to a predefined time-pressure profile, to at least reduce defects in the part occurring due to extraction of solvent from the part during application of the vacuum that stops the CMP.

15. The processing station of claim 14, wherein the predefined time-pressure profile is defined by at least one of: (i) a material of the part, (ii) a geometry of the part, (iii) a composition of the solvent, (iv) a quantity of vaporized solvent delivered by the solvent delivery system, (v) a temperature within the chamber, and (vi) a solvent exposure time.

16. The method of claim 1, wherein the predefined time-pressure profile comprises reducing the pressure within the chamber over time in a step-wise manner.

17. The method of claim 8, wherein the predefined time-pressure profile comprises reducing the pressure within the chamber over time in a step-wise manner.

18. The processing station of claim 14, wherein the predefined time-pressure profile comprises reducing the pressure within the chamber over time in a step-wise manner.

\* \* \* \* \*